United States Patent
Bhattacharjee et al.

(10) Patent No.: US 8,694,738 B2
(45) Date of Patent: Apr. 8, 2014

(54) SYSTEM AND METHOD FOR CRITICAL ADDRESS SPACE PROTECTION IN A HYPERVISOR ENVIRONMENT

(75) Inventors: Rajbir Bhattacharjee, New Delhi (IN); Nitin Munjal, Haryana (IN); Balbir Singh, Haryana (IN); Pankaj Singh, Haryana (IN)

(73) Assignee: McAfee, Inc., Santa Clara, CA (US)

( * ) Notice: Subject to any disclaimer, the term of this patent is extended or adjusted under 35 U.S.C. 154(b) by 272 days.

(21) Appl. No.: 13/271,102

(22) Filed: Oct. 11, 2011

(65) Prior Publication Data

US 2013/0091318 A1    Apr. 11, 2013

(51) Int. Cl.
G06F 13/00    (2006.01)

(52) U.S. Cl.
USPC ............... 711/151; 711/6; 711/163

(58) Field of Classification Search
USPC ............... 711/6, 151, 163
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A | 5/1999 | Garibay et al. | |
| 5,926,832 A | 7/1999 | Wing et al. | |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.

(Continued)

*Primary Examiner* — Reba I Elmore
(74) *Attorney, Agent, or Firm* — Patent Capital Group

(57) ABSTRACT

A system and method in one embodiment includes modules for detecting an access attempt to a critical address space (CAS) of a guest operating system (OS) that has implemented address space layout randomization in a hypervisor environment, identifying a process attempting the access, and taking an action if the process is not permitted to access the CAS. The action can be selected from: reporting the access to a management console of the hypervisor, providing a recommendation to the guest OS, and automatically taking an action within the guest OS. Other embodiments include identifying a machine address corresponding to the CAS by forcing a page fault in the guest OS, resolving a guest physical address from a guest virtual address corresponding to the CAS, and mapping the machine address to the guest physical address.

20 Claims, 3 Drawing Sheets

(56) References Cited

U.S. PATENT DOCUMENTS

| | | |
|---|---|---|
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,546,333 B2 | 6/2009 | Alon et al. |
| 7,546,594 B2 | 6/2009 | McGuire et al. |
| 7,552,479 B1 | 6/2009 | Conover et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,341,627 B2 | 12/2012 | Mohinder |
| 8,381,284 B2 | 2/2013 | Dang et al. |
| 8,515,075 B1 | 8/2013 | Saraf et al. |
| 2002/0056076 A1 | 5/2002 | Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0073894 A1 | 4/2003 | Chiang et al. |
| 2003/0074552 A1 | 4/2003 | Olkin et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0143749 A1 | 7/2004 | Tajali et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |

(56) References Cited

U.S. PATENT DOCUMENTS

| | | |
|---|---|---|
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2007/0300241 A1 | 12/2007 | Prakash et al. |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0006805 A1 | 1/2009 | Anderson et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0172822 A1 | 7/2009 | Sahita et al. |
| 2009/0249053 A1 | 10/2009 | Zimmer et al. |
| 2009/0249438 A1 | 10/2009 | Litvin et al. |
| 2010/0071035 A1 | 3/2010 | Budko et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1* | 2/2011 | Mohinder ................. 718/1 |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0179874 A1 | 7/2012 | Chang et al. |
| 2012/0278853 A1 | 11/2012 | Roy-Chowdhury et al. |
| 2012/0290827 A1 | 11/2012 | Bhargava et al. |
| 2012/0297176 A1 | 11/2012 | Bhargava et al. |
| 2012/0331464 A1 | 12/2012 | Saito et al. |
| 2013/0024934 A1 | 1/2013 | Sebes et al. |
| 2013/0086550 A1* | 4/2013 | Epstein .................. 717/110 |
| 2013/0097355 A1 | 4/2013 | Dang et al. |
| 2013/0097356 A1 | 4/2013 | Dang et al. |
| 2013/0117823 A1 | 5/2013 | Dang et al. |
| 2013/0132690 A1* | 5/2013 | Epstein .................. 711/159 |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | 2013/055498 A1 | 4/2013 |
| WO | 2013/055502 A1 | 4/2013 |
| WO | 2013055499 A1 | 4/2013 |
| WO | WO 2013/055498 | 4/2013 |
| WO | WO 2013/055499 | 4/2013 |
| WO | WO 2013/055502 | 4/2013 |

OTHER PUBLICATIONS

Bhatkar, et al., "Efficient Techniques for Comprehensive Protection from Memory Error Exploits," USENIX Association, 14th USENIX Security Symposium, Aug. 1-5, 2005, Baltimore, MD, 16 pages.

Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.

Shacham, et al., "On the Effectiveness of Address-Space Randomization," CCS'04, Oct. 25-29, 2004, Washington, D.C., Copyright 2004, 10 pages.

Notice of Allowance received for U.S. Appl. No. 12/322,220, mailed on Apr. 17, 2013, 14 pages.

Final Office Action received for U.S. Appl. No. 12/545,745, mailed on Jun. 7, 2012, 14 pages.

Non Final Office Action received for U.S. Appl. No. 12/545,745, mailed on Jan. 5, 2012, 12 pages.

Notice of Allowance received for U.S. Appl. No. 12/545,745, mailed on Aug. 29, 2012, 8 pages.

Response to Final Office Action and RCE for U.S. Appl. No. 12/545,745, filed Jul. 31, 2012, 15 pages.

Response to Non Final Office Action for U.S. Appl. No. 12/545,745, filed Mar. 28, 2012, 12 pages.

"Shadow Walker" Raising the Bar for Rootkit Detection by Sherri Sparks and Jamie Butler, Black Hat Japan 2005, Tokyo, Japan, Oct. 17-18, 2005, 55.

Countering Kernel Rootkits with Lightweight Hook Protection, available at http://research.microsoft.com/en-us/um/people/wdcui/papers/hooksafe-ccs09.pdf, 16th ACM Conference on Computer and Communications Security (CCS 2009) Chicago, IL, Nov. 2009, 10 pages.

Detecting Kernel Rootkits, by Rainer Whichmann, available at http://www.la-samhna.de/library/rootkits/detect.html, copyright 2006, 2 pages.

Guest-Transparent Prevention of Kernel Rootkits with VMM-Based Memory Shadowing, 11th International Symposium on Recent Advances in Intrusion Detection, Cambridge, Massachusetts (Sep. 15-17, 2008), 20 pages.

McAfee Proven Security, Rootkits, Part 1 of 3: The Growing Threat (Apr. 2006), available at www.mcafee.com, 8 pages.

Multi-Aspect Profiling of Kernel Rootkit Behavior, Eurosys Conference 2009, Nuremberg, Germany, Mar. 30-Apr. 3, 2009, 14 pages.

Rootkits Part 2: A Technical Primer, available at www.mcafee.com (http://www.mcafee.com/cf/about/news/2007/20070418_174400_d.aspx) Apr. 18, 2007, 16 pages.

SecVisor: A Tiny Hypervisor to Provide Lifetime Kernel Code Integrity for Commodity OSes, Proceedings of the 21st ACM SIGOPS Symposium on Operating Systems Principles, Stevenson, WA (Oct. 14-17, 2007), 16 pages.

(56) References Cited

OTHER PUBLICATIONS

Stopping Rootkits at the Network Edge (Jan. 2007) http://www.trustedcomputinggroup.org/files/resource_files/C2426F48-1D09-3519-AD02D13C71B888A6/Whitepaper_Rootkit_Strom_v3.pdf, 3 pages.
Transparent Protection of Commodity OS Kernels Using Hardware Virtualization, 6th International ICST Conference on Security and Privacy in Communication Networks, Singapore, Sep. 7-9, 2010, 18 pages, 18 pages.
International Search Report and Written Opinion mailed Jan. 25, 2013 for International Application No. PCT/US2012/055670 (7 pages).
International Search Report and Written Opinion, International Application No. PCT/US2012/055660, mailed Feb. 18, 2013, 10 pages.
Lecture Embedded System Security, Chapter 6: Return-oriented Programming, Prof. Dr.-Ing. Ahmad-Reza Sadeghi, et al., Technische Universitat Damstadt (CASED), Germany, Summer Term 2011, http://www.trust.informatik.tu-darmstadt.de/fileadmin/user_upload/Group_TRUST/LectureSlides/ESS-SS2011/rop-grayscale.pdf[Background on Butter Overflow Attacks/Sadeghi et al./2011, 51 pages.
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
Kurt Gutzmann, "Access Control and Session Management in the HTTP Environment," Jan./Feb. 2001, pp. 26-35, IEEE Internet Computing.
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 11/060,683, entitled "Distribution and Installation of Solidified Software on a Computer," Filed Feb. 16, 2005, Inventor(s): Bakul Shah et al.
U.S. Appl. No. 11/379,953, entitled "Software Modification by Group to Minimize Breakage," filed Apr. 24, 2006, Inventor(s): E. John Sebes et al.
U.S. Appl. No. 11/437,317, entitled "Connectivity-Based Authorization," filed May 18, 2006, Inventor(s): E. John Sebes et al.
U.S. Appl. No. 12/291,232, entitled "Method of and System for Computer System State Checks," filed Nov. 7, 2008, inventor(s): Rishi Bhargava et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/322,220, entitled "Method of and System for Malicious Software Detection Using Critical Address Space Protection," filed Jan. 29, 2009, Inventor(s): Suman Saraf et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
Barrantes et al., "Randomized Instruction Set Emulation to Disrupt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/880,125, entitled "System and Method for Clustering Host Inventories," filed Sep. 12, 2010, Inventor(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 13/037,988, entitled "System and Method for Botnet Detection by Comprehensive Email Behavioral Analysis," filed Mar. 1, 2011, Inventor(s) Sven Krasser, et al.
U.S. Appl. No. 12/322,321, entitled "Method of and System for Computer System Denial-of-Service Protection," filed Jan. 29, 2009, Inventor(s): Suman Saraf et al.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,277, entitled "Method and Apparatus for Process Enforced Configuration Management," filed Jul. 25, 2012, Inventor(s) Rishi Bhargava et al.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.Ist.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.

(56) References Cited

OTHER PUBLICATIONS

Rivest, R., "The MD5 Message-Digest Algorithm", RFC 1321, Apr. 1992, retrieved on Dec. 14, 2012 from http://www.ietf.org/rfc/rfc1321.txt, 21 pages.

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

U.S. Appl. No. 13/728,705, filed Dec. 27, 2012, entitled "Herd Based Scan Avoidance System in a Network Environment," Inventor(s) Venkata Ramanan, et al.

International Search Report and Written Opinion mailed Dec. 14, 2012 for International Application No. 04796-1087WO, 9 pages.

International Search Report received for PCT Application No. PCT/US2012/055674, mailed on Dec. 14, 2012, 2 pages.

Nonfinal Office Action for U.S. Appl. No. 13/273,002, mailed on Oct. 4, 2013, 17 pages.

Grace, Michael, et al., "Transparent Protection of Commodity OS Kernels Using Hardware Virtualization," 2010, SecureComm 2010, LNICST 50, pp. 162-180, 19 pages.

Riley, Ryan, et al., "Guest-Transparent Prevention of Kernel Rootkits with VMM-Based Memory Shadowing," 2008, RAID 2008, LNCS 5230, pp. 1-20, 20 pages.

Milos, Grzegorz, et al., "Satori: Enlightened page sharing," Proceedings of the 2009 conference on USENIX Annual technical conference, 14 pages.

USPTO Final Office Action for U.S. Appl. No. 13/273,002, mailed on Jan. 31, 2014, 17 pages.

* cited by examiner

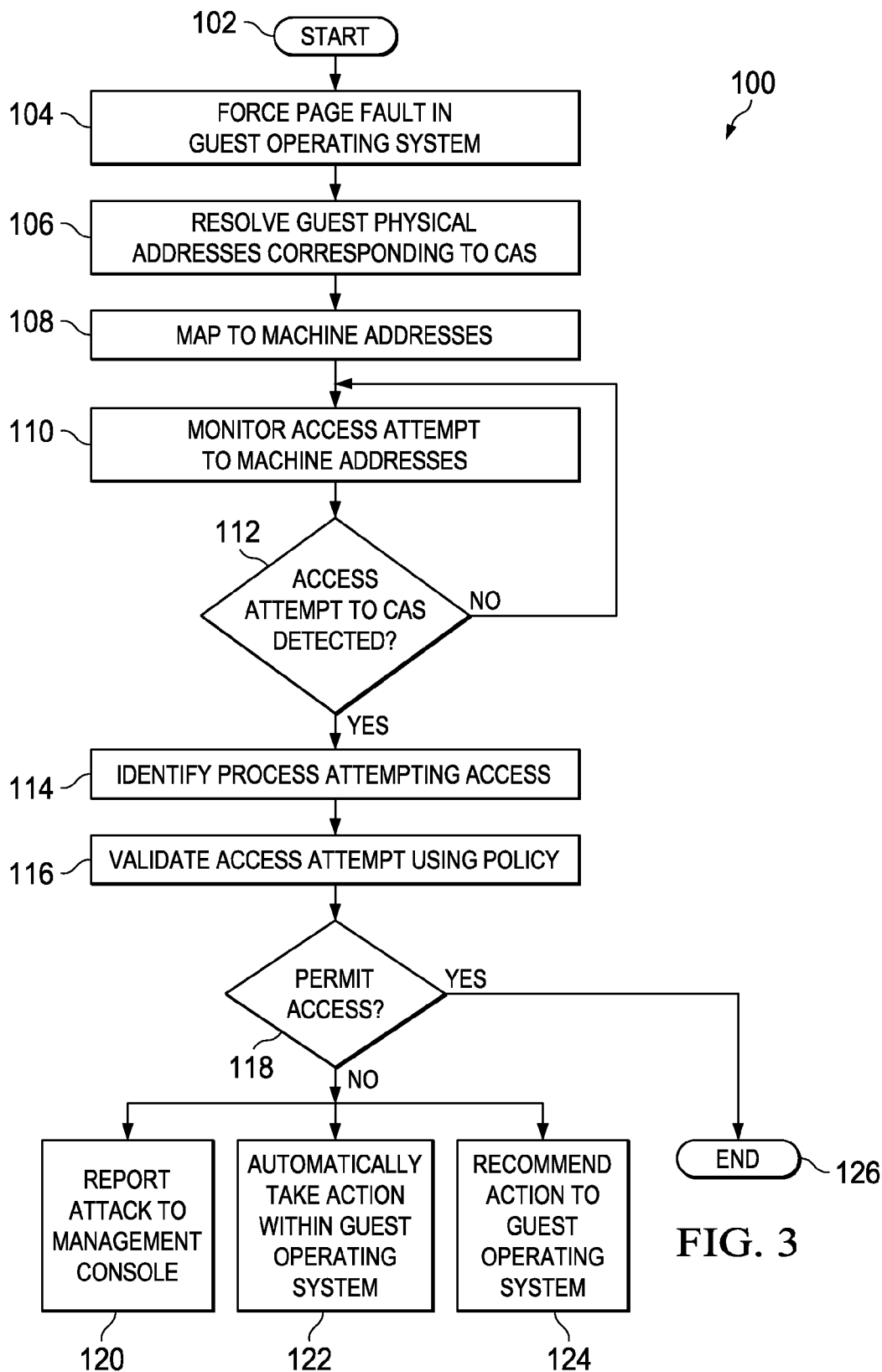

SYSTEM AND METHOD FOR CRITICAL ADDRESS SPACE PROTECTION IN A HYPERVISOR ENVIRONMENT

TECHNICAL FIELD

This disclosure relates in general to the field of computer networks and, more particularly, to a system and a method for critical address space protection in a hypervisor environment.

BACKGROUND

The field of computer network security has become increasingly important and complicated in today's society. Computer network environments are configured for virtually every enterprise or organization, typically with multiple interconnected computers (e.g., end user computers, laptops, servers, printing devices, etc.). Moreover, cloud service providers (and other organizations that run multiple applications and operating systems) may use hypervisor technology to run various different guest operating systems concurrently on a host device. A hypervisor is computer software/hardware platform virtualization software that allows multiple operating systems to run on a host computer concurrently. Security threats can originate externally and internally in the hypervisor environment. These threats in the hypervisor environment can present further challenges to IT administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow-chart illustrating example operational steps that may be associated with embodiments of the present disclosure.

DETAILED DESCRIPTION OF EXAMPLE EMBODIMENTS

Overview

A system and method in one embodiment includes modules for detecting an access attempt to a critical address space (CAS) of a guest operating system (OS) that implements address space layout randomization (ASLR) in a hypervisor environment, identifying a process attempting the access, and taking at least one action if the action is not permitted. The action may be one or more of: reporting the access to a management console of the hypervisor, providing a recommendation to the guest OS, and automatically taking an action within the guest OS. Reporting the access to a management console of the hypervisor includes flagging a status of the guest OS as infected. Providing a recommendation to the guest OS includes recommending that the process be blacklisted, until it is scanned and whitelisted by a security tool, and/or running an anti-virus on the process. Taking an action within the guest OS includes running an anti-virus program in the guest OS and/or shutting down or saving a state of the guest OS for offline scanning.

More specific embodiments include the detecting the access attempt by generating page table entries (PTEs) for pages corresponding to the CAS in a shadow page table of the hypervisor and marking the PTEs such that the access attempt results in a page fault. The process attempting the access may be identified by reading a CR3 register corresponding to the process.

Other embodiments include validating the access attempt using a policy, including denying the access if the process is executing from a writeable area of a memory element, and permitting the access if the process is executing from a read-only area of the memory element. Other example embodiments include identifying a machine address corresponding to the CAS by forcing a page fault in the guest OS, resolving a guest physical address from a guest virtual address corresponding to the CAS, and mapping the machine address to the guest physical address and other features.

EXAMPLE EMBODIMENTS

Figure 1:
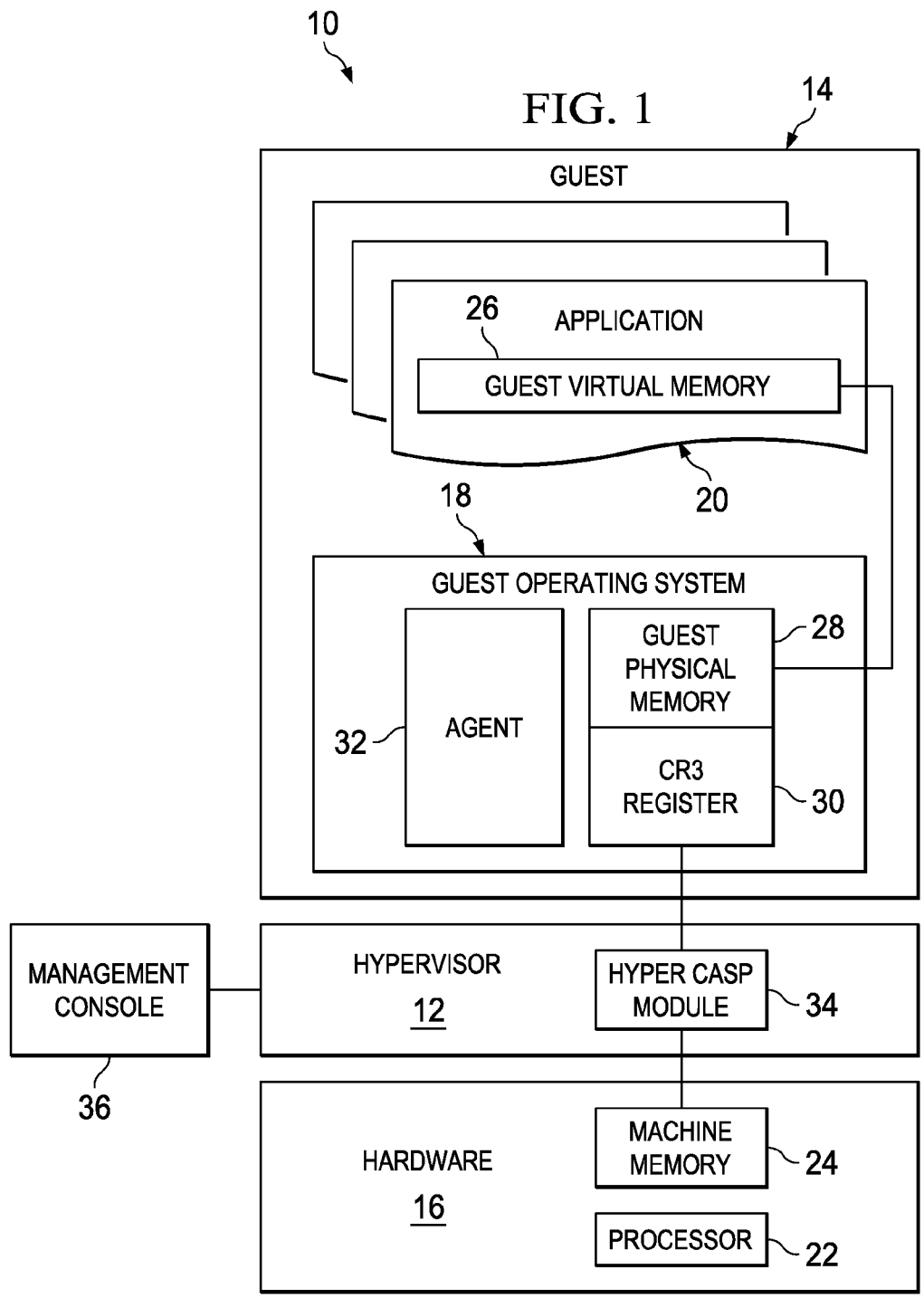
FIG. 1 is a simplified block diagram illustrating components of a system for critical address space protection in a hypervisor environment according to an example embodiment.

FIG. 1 is a simplified block diagram illustrating an example implementation of a system 10 for critical address space protection in a hypervisor environment. As used herein, a "hypervisor" is a hardware virtualization entity that allows one or more operating systems (OSs), termed "guest OSs," to run concurrently on a host device (e.g., computer). In an example embodiment, a hypervisor can run directly on the host device's hardware to control the hardware and to manage guest OSs. In an alternate embodiment, a hypervisor can run within a conventional OS environment (such as Linux OS) as a software layer supporting one or more guest OSs running on a higher level. Virtualization allows the guest OSs to run unmodified on isolated virtual environments (typically referred to as virtual machines or guests), where the host device's physical characteristics and behaviors are reproduced. More specifically, a guest can represent an isolated, virtual environment equipped with virtual hardware (processor, memory, disks, network interfaces, etc.). According to the embodiment illustrated in FIG. 1, system 10 comprises a hypervisor 12, which provides a virtualization environment to a guest 14. Any number of guests may be hosted on hypervisor 12 within the broad scope of the present disclosure. A single guest is representatively illustrated in FIG. 1 for ease of explanation.

Hypervisor 12 controls and manages hardware 16 of a host device (not shown) that is allocated for use by guest 14. Guest 14 may run a guest OS 18 on hypervisor 12. Guest OS 18 may support one or more applications 20. Hypervisor 12 may manage access of one or more applications 20 (referred to herein in the singular as application 20 to refer to one of the applications) to underlying hardware 16, such as a processor 22 and a machine memory 24. As used herein, "machine memory" refers to a memory element that is visible to hypervisor 12 as available on the host device. Guest OS 18 may present to applications 20 a guest virtual memory 26, which accesses a guest physical memory 28. As used herein, "guest virtual memory" refers to a substantially continuous virtual address space that is visible to applications 20 running inside guest 14. An address space refers to a range of discrete addresses, each of which may correspond to a memory location (i.e., address) at which an application (e.g., application 20) can store data and retrieve data later. "Guest physical memory" refers to the virtual memory that is visible to guest OS 18.

Guest 14 includes a virtual control register, namely, CR3 register 30, which points to the beginning of a page table of a process of application 20. A process is an instance of an application (or a portion thereof), whose instructions are being executed. Application 20 in guest OS 18 may consist of a number of processes. Each process can have its own (unique) process address space. Each process address space has a corresponding page table. A page table is a data structure used by guest OS 18 to store a mapping between virtual addresses and physical addresses. For example, CR3 register 30 may uniquely identify a process that attempts to access a protected area of memory in guest OS 18 called critical address space (CAS), which includes system libraries (e.g., kernel32.dll).

Guest OS 18 includes an agent 32 (as part of a guest image) that communicates with a hyperCASP module 34 in hypervisor 12. HyperCASP module 34 may also communicate with guest physical memory 28, CR3 register 30 and machine memory 24. HyperCASP module 34 may protect guest 14 against potential malware attacks by trapping access attempts to the CAS and examining the context from which the access attempt occurs inside the hypervisor environment.

Hypervisor 12 may be managed using a management console 36. Management console 36 may provide a unified interface to manage guest 14 on hypervisor 12. Management console 36 may provide a means for an administrator to configure hypervisor 12, including storage, controlling aspects of guest behavior, and setting up virtual networks. In an example embodiment, management console 36 may provide an interface for the administrator to view a status of guest 14, including whether it is under attack by malware and/or other unwanted applications.

According to embodiments of the present disclosure, components of system 10 may detect an access attempt to the CAS of guest OS 18, identify the process that performs the access attempt, determine whether the access is permitted, and if the access is not permitted, take one or more protective actions such as report the access attempt to management console 36, provide a recommendation to guest OS 18, automatically take an action within guest OS 18, etc.

For purposes of illustrating the techniques of system 10, it is important to understand the activities and security concerns that may be present in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In one method of managing physical memory, memory may be divided into blocks or pages that cover a continuous range of memory addresses. Each block or page is given attributes that includes whether the memory is read-only, read/write or write-only. When an application or a library (including a dynamically linked library such as kernel32.dll) is loaded into memory, the corresponding code instructions are loaded into read-only memory and data is loaded into writable memory. Thus, code instructions may be read and executed from read-only memory. Some memory, such as that containing executable code (e.g., instructions), is typically read-only memory; the operating system may not allow a process to write data over its executable code. By contrast, (non-malware) pages containing data can be written to, but attempts to execute that memory as instructions may fail.

However, malicious code may be configured to be loaded or injected into data, and may be configured to execute from writable memory, and not read-only memory, as expected. Detection of code running in writable memory space may be an indication that the code is malicious. For example, buffers used in networking are overflowed to inject malicious code. Web servers receiving service requests with data from untrusted hosts can be infected with malicious code embedded in the request and loaded by overflowing the web server's buffer. A predominant characteristic of malicious code loaded by buffer overflows (or by other improper techniques) is that the code is loaded into (and executed from) memory that is writeable.

In computer security, executable space protection can be used to mark certain memory regions (e.g., stack and heap memory) as non-executable, such that an attempt to execute machine code in these regions can cause an exception, or page fault. A page fault is a trap when a program accesses a page that is mapped in the virtual memory (e.g., guest virtual memory in hypervisor environments), but not loaded in the physical memory (e.g., machine memory in hypervisor environments). Such an approach helps to prevent certain buffer overflow attacks from succeeding, particularly those that inject and execute code. These attacks rely on some part of memory, usually the stack, being both writeable and executable. One method of detecting execution of malicious code is to check the memory attribute from which every processor instruction executes. However, such an approach may require large processing overhead to check memory attributes of every executed instruction, degrading computer performance.

Another technique to protect against malware execution is by controlling access to the CAS. CAS protection (CASP) protects against buffer overflow and stack overflow attacks by trapping access attempts to the CAS and examining the context from which the access attempt occurs. For example, most malware performs a lookup of kernel32.dll for function resolution (e.g., export functions). Kernel32.dll is a central module that contains core processes of an operating system, such as memory management, input/output operations, interrupts etc. Accordingly, CASP techniques can protect against attacks such as buffer overflow and stack overflow attacks by trapping access attempts to kernel32.dll.

Address space layout randomization (ASLR) is another technique that may be used to prevent security attacks by making it more difficult for an attacker to predict target addresses. ASLR moves executable images (i.e., units of program code in a format executable by a processor, such as files in DLL format or EXE format) into random locations when an operating system boots, making it harder for exploit code to operate predictably. The intention of ASLR is to protect physical memory from viruses and other malware. With ASLR, the OS (e.g., guest OS 18 in a hypervisor environment) randomly arranges positions of key data areas, including positions of libraries, heap and stack in a process's virtual address space. Without the use of ASLR, an attack could use hardcoded addresses of known locations in a process's address space (e.g., specific library functions) to perform its functions.

In an example, when an application creates a heap, the heap manager of the OS creates that heap at a random location in the process address space to help reduce the chance of success of a heap-based buffer overrun exploit. In another example, when a thread starts in a process, the OS (e.g., guest OS 18) moves the thread's stack to a random location in the process address space to help reduce the chance of success of a stack-based buffer overrun exploit. In yet another example, ASLR may cause each execution of a program to result in a different memory space layout, which causes dynamically loaded libraries (DLLs) to get loaded into different locations each time. Many malware attacks rely on a programmer's ability to accurately identify where specific processes or system functions reside in memory. With ASLR, address positions are randomized, making it harder for malware code to execute successfully.

For example, in Windows Vista OS, when loading an executable image that has elected to participate in ASLR, the OS uses a random global image offset selected once per reboot from a range of 256 values. Executable images loaded together into a process, including the EXEs and DLLs, are loaded one after another at this offset. When executing a program whose executable image has been marked for ASLR, the memory layout of the process is further randomized by placing the thread stack and the process heaps randomly. The stack address is selected first from a range of 32 possible locations. Once the stack has been placed, the initial stack pointer is further randomized by a random amount (e.g., chosen from one of 16,384 possible values on an IA32 system). Once the stack address has been selected, the process heaps are selected. Each heap is allocated from a range of 32 different locations. The location of the first heap is chosen to avoid the previously placed stack, and each of the heaps following must be allocated to avoid those that come before. In Windows Vista, some address space layout parameters, such as Process Environment Block, stack, and heap locations, are selected once per program execution. Other parameters, such as the location of the program code, data segment, and libraries, change only between reboots.

In a hypervisor environment, effects of an attack may be more severe than in a non-virtualized environment. One infected guest could infect all other guests on the host device. For example, an attacker can get administrator privileges on the hardware through infecting a guest, and can move from one guest to another over the hypervisor environment. In situations where the hypervisor hosts tens of hundreds of guests, such a guest-to-guest attack could have catastrophic results.

Turning to some preliminary information associated with how virtual memory systems are configured in the hypervisor, when running a guest, the hypervisor creates a contiguous addressable memory space for the guest. This memory space has the same properties as the guest virtual memory. This allows the hypervisor to run multiple virtual machines simultaneously while protecting the memory of each virtual machine from being accessed by others. Therefore, from the view of the application running inside the guest, the hypervisor adds an extra level of address translation that maps a guest physical address to a machine address. Communication between the guest OS and hypervisor happens via hypercalls, which may set up parameters in the guest physical address, and the hypervisor may decode the parameters, map the guest physical address to the machine address and perform the requested action.

The guest physical memory (e.g., guest physical memory 28) is merely an abstraction utilized by the hypervisor (e.g., hypervisor 12) for maintaining correct mapping to the host physical address (also called machine address). Shadow page tables are used by the hypervisor (e.g., hypervisor 12) to map the guest physical memory (e.g., guest physical memory 28) to the machine memory (e.g., machine memory 24). Typically, there is no guarantee that any pages, to which the guest page tables point, are present in machine memory. The hypervisor (e.g., hypervisor 12) is configured to enable a page fault every time there is an attempt by the guest OS (e.g., guest OS 18) to access a not-present page. Upon triggering a page fault, a page fault handler in the hypervisor facilitates loading the appropriate page (e.g., from disk) into machine memory, and updates the hypervisor's shadow page tables to reflect the changes. Execution of the instruction that caused the page fault resumes after the page has been loaded into machine memory and the paging tables appropriately point to the correct page. The hypervisor's paging tables reflect which pages are actually (i.e., physically) loaded in machine memory, while the guest paging tables are merely virtual.

Turning to process memory management, in many processors (not necessarily running hypervisors), a control register called CR3 register (e.g., CR3 register 30) contains the physical address of the root (i.e., the beginning) of the current page table (called the page directory). In a hypervisor environment, the CR3 register in the guest may be virtualized and may point to the guest physical address of the root of the current guest page table. The physical processor (e.g., processor 22) uses another CR3 register (not shown), and not the guest CR3 register (e.g., CR3 register 30), to address machine memory 24. The processor's CR3 register points to the hypervisor's page directory, not to the guest page directory. In contrast, the guest CR3 register (e.g., CR3 register 30) points to the guest page directory, which points to the guest page tables. Thus, with the virtual guest address converted to machine address through the sequence of guest CR3 register to guest page directory to guest page table to shadow page table to physical page, the current instruction can be executed.

Content of guest CR3 register 30 is updated by the kernel of the guest OS (e.g., guest OS 18) to point to appropriate page tables used by the currently executing process. Thus, the guest OS (e.g., guest OS 18) switches between processes by changing the value of the guest CR3 register (e.g., CR3 register 30). In virtual machines (e.g., guest 14), the hypervisor (e.g., hypervisor 12) intercepts any access to the CR3 register (e.g., CR3 register 30) and thereby determines the page to be fetched from machine memory 24 for the currently executing process.

Turning back to malware protection techniques, vulnerabilities in the hypervisor may undermine the effectiveness of ASLR. For example, a known vulnerability in a hypervisor makes otherwise inaccessible portions of machine memory available for read/write access to applications running in the guest OS. Malware could exploit this vulnerability to gain control of the machine memory, despite ASLR. While CASP can be implemented inside the guest OS (e.g., guest OS 18) in the hypervisor environment, CASP in the guest OS cannot protect against vulnerabilities in the hypervisor. Moreover, a hypervisor-based implementation can provide an OS agnostic solution. There is value to the end user in such a solution because security software need not be installed individually inside each guest. Malware attacking the guest is oblivious to this security layer running inside the hypervisor. One of the challenges in implementing CASP in the hypervisor with ASLR implemented by guest OSs is that the hypervisor may not know the critical addresses to protect because the CAS is randomized by ASLR within the guest physical memory every time an application loads or there is a reboot of the guest operating system. Another challenge is to uniquely identify the guest process context from which the attack originates, so that appropriate protective action may be taken.

A system for critical address space protection in a hypervisor environment outlined by FIG. 1 can resolve these issues, among others. Embodiments of the present disclosure seek to vastly improve capabilities of existing technologies to allow for a more robust solution. In example embodiments, components of system 10 may detect access to the CAS of guest OS 18 in the hypervisor environment, wherein guest OS 18 implements ASLR, identify the process requesting the access, determine whether the access is permitted, and if the access is not permitted, take one or more protective actions.

As illustrated in FIG. 1, hyperCASP module 34 may communicate with agent 32 to identify the machine addresses corresponding to guest physical addresses of the CAS. Agent 32 may force a page fault in guest OS 18 by deliberately reading from the CAS addresses, and resolve the guest physical address from the guest virtual address. For example, the page fault may cause hypervisor 12 to intercept the page fault event and agent 32 may check the guest page table to determine the guest physical address of the corresponding guest virtual address. In another example, a page fault handler in hypervisor 12 may monitor the mapping of the guest physical page and may establish a corresponding mapping to the machine page in response to the page fault (e.g., by trapping accesses to the guest page tables).

Agent 32 may communicate the CAS guest physical addresses to hyperCASP module 34, which may map the machine addresses to the corresponding guest physical addresses. Thus, hyperCASP module 34 identifies the machine addresses to be protected. A page fault handler in hypervisor 12 may make an entry for those pages point to the corresponding pages in machine memory 24. In one example embodiment, agent 32 may communicate the CAS addresses to hyperCASP module 34 using a two way communication channel. By protecting the address space in machine memory 24 corresponding to the CAS in guest virtual memory 28, hypervisor 12 can protect against malware attacks from within guest OS 18, for example, malware attempting to access the CAS.

According to embodiments of the present disclosure, hyperCASP module 34 may the detect an access attempt to the CAS by generating page table entries (PTEs) for pages corresponding to the CAS in the shadow page table of the hypervisor, marking the pages as NOT_PRESENT in the PTEs, such that substantially every access attempt results in a page fault. The page fault transfers control to hypervisor 12, so that hypervisor 12 can identify the process that accesses the CAS.

In one example embodiment, hyperCASP module 34 may read CR3 register 30 to identify the process attempting to access the CAS. Generally, hypervisors that use shadow page tables (like hypervisor 12) (e.g., shadow page tables implemented and accelerated using hardware support like Extended Page Tables/Nested Page Tables (EPT/NPT)) may trap CR3 register accesses for proper operation of guest 14. Thus, changes to CR3 register 30 may be trapped by hyperCASP module 34 to uniquely identify the process running in guest 14 that accesses the CAS. CR3 register 30 can identify the process by maintaining the root of the guest page tables of the current task. For example, a malware process may attempt to execute a task. The task has a context, which is a set of registers and values that are unique to the task. One such register is CR3 register 30, which contains the address of the malware process' page directory. Every time there is a CAS access within guest OS 18, hyperCASP module 34 may check to see if it is an attack (e.g., buffer/stack overflow) by looking at the page protection bits of an applicable instruction (of the process) that is currently executing.

HyperCASP module 34 may determine whether the access is permitted using a policy, such as a policy to deny the access if the access is from the writeable area of a memory element such as guest virtual memory, and a policy to permit the access if the access is from the read-only area of the memory element. For example, if a PTE shows that the access to the CAS in guest OS 18 came from a PTE in guest 14 with a write bit set, and a policy indicates that such status for the write bit is not permitted, the access may be illegal as it could be a result of a malware attack on the stack or heap of the process. In an example embodiment, hyperCASP module 34 may use the same bit (e.g., write bit) status value to allow bypassing of protection checks for false positives to allow legitimate access.

HyperCASP module 34 may take various protective actions to prevent execution of malware code. In an example embodiment, hyperCASP module 34 may report the access attempt to management console 36. An administrator can get a view of one or more guests (e.g., guest 14) running in system 10 (or in a set of systems, depending upon the environment), and hyperCASP module 34 may cause a flag to be set to mark the status of any infected guests. In another example embodiment, hyperCASP module 34 may provide a recommendation to guest OS 18 to blacklist the process until it is scanned and marked as clean (e.g., whitelisted) by an anti-virus or another security tool. In yet another example embodiment, hyperCASP module 34 may cause agent 32 to automatically take an action within guest OS 18, for example, run an anti-virus (initiated automatically) on detection of an attack within guest OS 18, or shutdown/save a state of the affected guest for offline scanning, etc.

Figure 2:
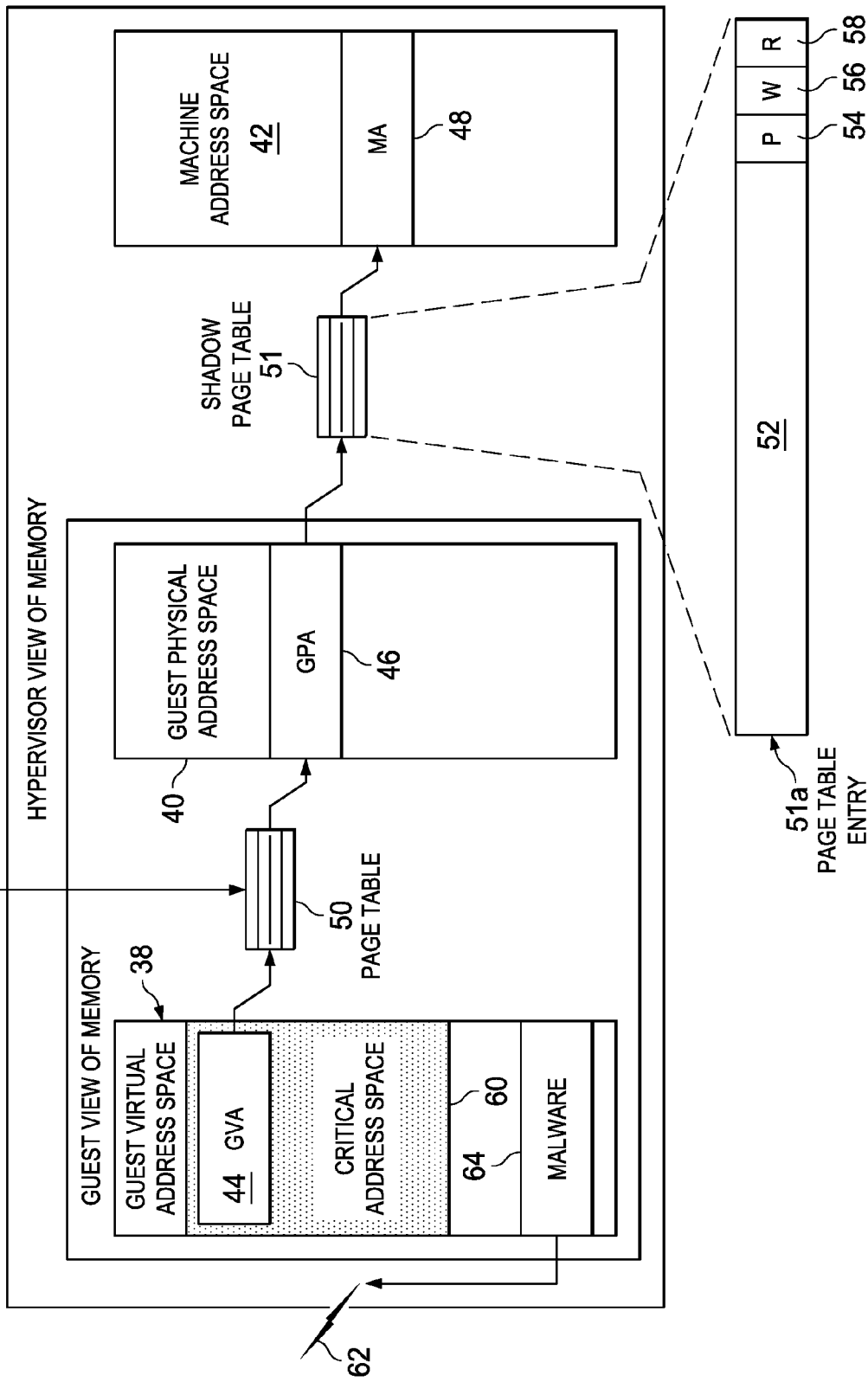
FIG. 2 is a simplified block diagram illustrating additional details of the system according to an example embodiment.

Turning to FIG. 2, FIG. 2 is a simplified block diagram illustrating additional details of the system according to an example embodiment. A challenge in implementing a hypervisor based solution to CASP is to identify the machine address corresponding to the CAS (like kernel32.dll). The addresses of the CAS may be resolved using two levels of paging, one in guest 14 and another in hypervisor 12.

Processor 22 accesses memory addresses to fetch instructions or to fetch and store data as it executes application 20. In a virtual memory system such as guest OS 18, all of the addresses are guest virtual addresses (GVAs) and not guest physical addresses (GPAs). The virtual addresses are converted into physical addresses by guest OS 18 based on information held in a set of guest page tables. The guest page table maps the process's guest virtual pages into guest physical pages in memory. Hypervisor 12 maintains a shadow page table, corresponding to each guest page table. Each page table (including guest page table and shadow page table) comprises a list of PTEs. When guest OS 18 launches a process, it creates a PTE for the CAS, along with other PTE entries; correspondingly, hypervisor 12 updates its shadow page table as well.

An example set of address spaces are shown in FIG. 2. Assume a process X (e.g., in application 20) runs in guest OS 18 and has a guest virtual address space 38 that maps into a corresponding guest physical address space 40 in guest OS 18. Each address space may be divided into a user space and the CAS such as kernel space. For example purposes and ease of explanation, the CAS in guest virtual address space 38 is indicated as CAS 60. Guest physical address space 40 maps into a machine address space 42. For example, a GVA 44 in guest virtual address space 38 may be mapped to a corresponding GPA 46 in guest physical address space 40, which in turn may be mapped to a machine address (MA) 48 in machine address space 42. Each of these mappings are protected by suitable PTEs in corresponding page tables. For example, GVA 44 may be mapped to GPA 46 through PTEs in a guest page table 50. Hypervisor 12 may create a shadow page table 51 to map GPA 46 to MA 48. Shadow page table 51 may contain PTEs in a format similar to the format of PTEs in guest page table 50.

An example PTE 51a of shadow page table 51 is shown in an exploded view in FIG. 2. PTE 51a comprises a physical page address 52 (e.g., MA 48) of a page, a present bit 54, a write bit 56 and a read bit 58. HyperCASP module 34 may use the information in present bit 54, write bit 56 and read bit 58 to determine if the CAS is being accessed by malware. From the status of present bit 54, hyperCASP module 34 can determine whether a page corresponding to a particular address is present or not. In one example, assume GPA 46 of 100 translates to MA 48 of 5000. HyperCASP module 34 would look at a PTE corresponding to 5000 and see if the process has access to MA 48 by reading present bit 54. If the process has access, present bit 54 would be set to 1. If present bit 54 is set to 0 (i.e., page is marked as NOT_PRESENT), indicating that the page is not present, a page fault may be raised. Control is then passed (by processor 22) to hypervisor 12 to fix the fault. In another example, code instructions that access the CAS may have read bit 58 set, and write bit 56 may not be set, indicating that the instructions are read-only (and not writable) and therefore permitted to have access.

When application 20 runs in guest OS 18, addresses of CAS 60 in guest virtual memory 26 may not necessarily be known to hypervisor 12, because addresses of CAS 60 may be randomized for security using ASLR by guest OS 18. When guest 14 starts up, agent 32 may force a fault inside guest OS 18 and resolve it so that mapping is established from GVAs (e.g., GVA 44) to GPAs (e.g., GPA 46) corresponding to CAS 60 (e.g., kernel32.dll). Agent 32 may trap a first access attempt to CAS 60 (e.g., by setting the present bit to 0 (i.e., marking a page as NOT_PRESENT) in a PTE for CAS 60), so that every subsequent access may be trapped. Trapping the first access attempt to CAS 60 may ensure that further access to CAS 60 can result in a page fault, because, if the present bit is established (or set to 1) for the corresponding GVAs (e.g., GVA 44), processor 22 will not create any faults for additional access attempts to the GVAs (e.g., GVA 44).

Agent 32 may communicate addresses of CAS 60 to hyperCASP module 34 using a two way communication channel. GVAs (e.g., GVA 44) corresponding to CAS 60 may be translated to GPAs (e.g., GPA 46) using guest page table 50, and to MAs (e.g., MA 48) using shadow page table 51. At this time, hypervisor 12 has identified the MAs (e.g., MA 48) to protect against attacks using CASP methods. HyperCASP module 34 may generate PTEs (e.g., PTE 51*a*) for pages corresponding to CAS 60 in shadow page table 51. HyperCASP module 34 may mark the pages as NOT_PRESENT in the PTEs (e.g., by setting present bit 54 to 0) to indicate that an access to CAS 60 results in a page fault 62. When an access to CAS 60 is detected through page fault 62, control passes to hypervisor 12 (through hyperCASP module 34), which may check if it is an attack (buffer/stack overflow). In an example embodiment, hyperCASP module 34 may run one or more checks (e.g., a predetermined set of checks) to see if the access is coming from a permitted process. Hypervisor 12 may transparently inspect activity within guest OS 18 without knowledge of guest OS 18.

To determine which process is attacking CAS 60, hyperCASP module 34 may use CR3 register 30. Typically, hypervisor 12 is not aware of tasks running inside guest OS 18. In an example embodiment, a malware 64 in process X may reside in guest virtual address space 38 and may attempt to access CAS 60 (e.g., kernel32.dll). Access to CAS 60 may result in page fault 62. Each task run by a process (e.g., process X) in guest OS 18, may be associated with a corresponding CR3 register 30, which comprises a task context that uniquely corresponds to the process that is performing the task. CR3 register 30 may point to a beginning of guest page table 50. HyperCASP module 34 may read CR3 register 30 and determine that process X is accessing CAS 60.

HyperCASP module 34 may validate the access attempt using a policy, including denying the access if the access is from a writeable area of a memory element (e.g., guest virtual address space 38) and permitting the access if the access is from a read-only area of the memory element. In an example embodiment, hyperCASP module 34 may read PTE 51*a* in shadow page table 51 corresponding to the instruction that is currently executing. Because malware typically resides in user space (and not kernel space), write bit 56 of PTE 51*a* may be set, indicating that the instruction is not read-only, and therefore may be illegal (e.g., indicating an attack on a stack or heap of process X).

Once hyperCASP module 34 indentifies the attack, it may perform one or more protective actions. For example, if hypervisor 12 is running multiple guests, hyperCASP module 34 may flag the status of a guest as infected to management console 36. Alternatively, or additionally, hyperCASP module 34 may send one or more messages to agent 32 to offline (e.g., shut down) guest 14 or start an anti-virus (e.g., targeting the particular process and flagged host or hosts for cleaning) and/or inform guest OS 18 about the process that is infected. In an example embodiment, a recommendation may include blacklisting the process until it is scanned and marked as clean (i.e., whitelisted) by an anti-virus or another security tool (e.g., program for testing and/or fixing vulnerabilities in computer software and/or hardware).

Turning to FIG. 3, FIG. 3 is a simplified flow-chart illustrating example operational steps that may be associated with embodiments of the present disclosure. Operations 100 begin in 102, when hyperCASP module 34 and agent 32 are activated. In 104, agent 32 forces a page fault 62 in guest OS 18 by deliberately reading from the CAS addresses. In 106, agent 32 resolves the GPAs (e.g., GPA 46) corresponding to CAS 60. In 108, the GPAs (e.g., GPA 46) is mapped to the corresponding MAs (e.g., MA 48) using shadow page table 51. In 110, access attempts to the MAs (e.g., MA 48) is monitored by hyperCASP module 34, for example, by marking the pages corresponding to CAS 60 as NOT_PRESENT in PTEs (e.g., PTE 51*a*) of shadow page table 51.

Any access attempt to CAS 60 may be detected in 112, for example, because an access attempt to CAS 60 results in page fault 62. If an access attempt is not detected (e.g., no page fault is generated), the process may loop back to monitoring in 110. When an access attempt is detected, however, control passes to hypervisor 12 in the form of page fault 62. In 114, the process attempting the access may be identified, for example, using CR3 register 30. HyperCASP module 34 may read CR3 register 30 to identify guest page table 50 corresponding to the process attempting the access. In 116, the access attempt may be validated using a policy. An example policy may indicate that write bit 56 is not set for valid access to CAS 60. If the policy does not permit access, as determined in 118, an attack may be indicated.

HyperCASP module 34 may take one or more protective actions in response, for example, reporting the access to management console 36 in 120; or automatically taking action within guest OS 18 in 122 (e.g., cause agent 32 to automatically initiate an anti-virus in guest OS 18; offline/shut down guest 14; save a state of guest OS 18 for offline scanning, etc.); or providing a recommendation to guest OS 18 in 124 (e.g., blacklist process, run anti-virus on the process, etc.). Similar actions may be taken for other resources used by the infected process like network sockets/file handles, etc. If the policy permits access, as determined in 118, the operations may end in 126.

Software for protecting address space (as well as inhibiting dangerous code from being executed) can be provided at various locations (e.g., within hyperCASP module 34). In one example implementation, this software is resident in a computer sought to be protected from a security attack (or protected from unwanted, or unauthorized manipulations of a writeable memory area). In a more detailed configuration, this software is specifically resident in a security layer of a hypervisor, which may include (or otherwise interface with) the components depicted by FIG. 1. In still other embodiments, software could be received or downloaded from a web server (e.g., in the context of purchasing individual end-user licenses for separate devices, separate virtual machines, hypervisors, servers, etc.) in order to provide this address space protection.

In other examples, the critical address space protection functions could involve a proprietary element (e.g., as part of an antivirus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, Xen devices, virtual devices, network appliances, routers, switches, gateway, processors, servers, loadbalancers, firewalls, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective protection of a critical address space. In addition, the critical address space protection functions can be consolidated in any suitable manner. Along similar design alternatives, any of the illustrated modules and components of the various FIGURES may be combined in various possible configurations: all of which are clearly within the broad scope of this Specification.

Any of these elements (e.g., a computer, a server, a network appliance, a firewall, a hypervisor, any other type of virtual element, etc.) may include a processor that can execute software or an algorithm to perform the critical address space protection activities as discussed in this Specification. Additionally, each of these elements (e.g., a computer, a server, a network appliance, a firewall, a hypervisor, any other type of virtual element, etc.) can include memory elements (random access memory (RAM), ROM, EPROM, EEPROM, ASIC, etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe.

These elements and/or modules can cooperate with each other in order to perform the activities in connection with critical address space protection in a hypervisor environment as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

Any of the memory items discussed herein (e.g., guest page table 50, shadow page table 51, machine memory 24, guest virtual memory 26, guest physical memory 28, guest virtual address space 38, guest physical address space 40, machine address space 42, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a secure environment.

A processor can execute any type of instructions associated with the data to achieve the operations detailed herein in this Specification. In one example, the processor (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable ROM (EEPROM)) or an ASIC that includes digital logic, software, code, electronic instructions, or any suitable combination thereof.

In certain example implementations, the address space protection functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in the FIGURES) can store data used for the operations described herein. This includes the memory element being able to store software, logic, code, or processor instructions that are executed to carry out the activities described in this Specification.

In various embodiments, some or all of these elements include software (or reciprocating software) that can coordinate, manage, or otherwise cooperate in order to achieve the operations as outlined herein. One or more of these elements may include any suitable algorithms, hardware, software, components, modules, interfaces, or objects that facilitate the operations thereof. Note that with the numerous examples provided herein, interaction may be described in terms of two, three, four, or more network elements and modules. However, this has been done for purposes of clarity and example only. It should be appreciated that the system can be consolidated in any suitable manner. Along similar design alternatives, any of the illustrated modules, components, and elements of FIG. 1 may be combined in various possible configurations, all of which are clearly within the broad scope of this Specification. In certain cases, it may be easier to describe one or more of the functionalities of a given set of flows by only referencing a limited number of elements or components. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
   detecting an access attempt to a critical address space (CAS) of a guest operating system (OS) in a hypervisor environment comprising a hypervisor, wherein address space layout randomization (ASLR) is implemented by the guest OS;
   identifying a process attempting the access; and
   taking an action if the process is not permitted to access the CAS.

2. The method of claim 1, wherein the detecting the access attempt comprises:
   generating page table entries (PTEs) for pages corresponding to the CAS in a shadow page table of the hypervisor;
   marking the PTEs such that the access attempt results in a page fault.

3. The method of claim 1, wherein the identifying the process attempting the access comprises reading a CR3 register corresponding to the process.

4. The method of claim 1, wherein the action is selected from:
   reporting the access to a management console of the hypervisor;
   providing a recommendation to the guest OS; and
   automatically taking an action within the guest OS.

5. The method of claim 4, wherein the reporting the access to a management console of the hypervisor includes flagging a status of the guest OS as infected.

6. The method of claim 4, wherein the providing a recommendation to the guest OS comprises at least one of:
   recommending that the process be blacklisted, until it is scanned and whitelisted by a security tool; or
   running an anti-virus on the process.

7. The method of claim 4, wherein the taking an action within the guest OS comprises at least one of:
   running an anti-virus program in the guest OS; or
   shutting down or saving a state of the guest OS for offline scanning.

8. The method of claim 1, further comprising validating the access attempt using a policy, comprising:
   denying the access if the process is executing from a writeable area of a memory element; and
   permitting the access if the process is executing from a read-only area of the memory element.

9. The method of claim 1, further comprising:
   identifying a machine address corresponding to the CAS, the identifying the machine address comprising:
   forcing a page fault in the guest OS;
   resolving a guest physical address from a guest virtual address corresponding to the CAS; and
   mapping the machine address to the guest physical address.

10. An apparatus comprising:
    a memory element configured to store data; and
    a computing processor operable to execute instructions associated with the data;
    a hypervisor; and
    an agent residing in a guest operating system (OS), such that the apparatus is configured for:
      detecting an access attempt to a critical address space (CAS) of the guest OS in a hypervisor environment comprising the hypervisor, wherein address space layout randomization (ASLR) is implemented by the guest OS;
      identifying a process attempting the access; and
      taking an action if the process is not permitted to access the CAS.

11. The apparatus of claim 10, wherein the detecting the access attempt comprises:
    generating page table entries (PTEs) for pages corresponding to the CAS in a shadow page table of the hypervisor;
    marking the PTEs such that the access attempt results in a page fault.

12. The apparatus of claim 10, wherein the identifying the process attempting the access comprises reading a CR3 register corresponding to the process.

13. The apparatus of claim 10, wherein the action is selected from:
    reporting the access to a management console of the hypervisor;
    providing a recommendation to the guest OS; and
    automatically taking an action within the guest OS.

14. The apparatus of claim 10, wherein the apparatus is further configured for:
    identifying a machine address corresponding to the CAS, the identifying comprising:
    forcing a page fault in the guest OS;
    resolving a guest physical address from a guest virtual address corresponding to the CAS; and
    mapping the machine address to the guest physical address.

15. Logic encoded in non-transitory media that includes code for execution and when executed by a processor is operable to perform operations comprising:
    detecting an access attempt to a critical address space (CAS) of a guest operating system (OS) in a hypervisor environment comprising a hypervisor, wherein address space layout randomization (ASLR) is implemented by the guest OS;
    identifying a process attempting the access; and
    taking an action if the process is not permitted to access the CAS.

16. The logic of claim 15, wherein the detecting the access attempt comprises:
    generating page table entries (PTEs) for pages corresponding to the CAS in a shadow page table of the hypervisor;
    marking the PTEs such that the access attempt results in a page fault.

17. The logic of claim 15, wherein the identifying the process attempting the access comprises reading a CR3 register corresponding to the process.

18. The logic of claim 15, wherein the action is selected from:
    reporting the access to a management console of the hypervisor;
    providing a recommendation to the guest OS; and
    automatically taking an action within the guest OS.

19. The logic of claim 15, further comprising validating the access attempt using a policy, comprising:

denying the access if the process is executing from a writeable area of a memory element; and permitting the access if the process is executing from a read-only area of the memory element.

20. The logic of claim 15, further comprising:

identifying a machine address corresponding to the CAS, the identifying comprising:
  forcing a page fault in the guest OS;
  resolving a guest physical address from a guest virtual address corresponding to the CAS; and
  mapping the machine address to the guest physical address.

* * * * *